Figure 1:
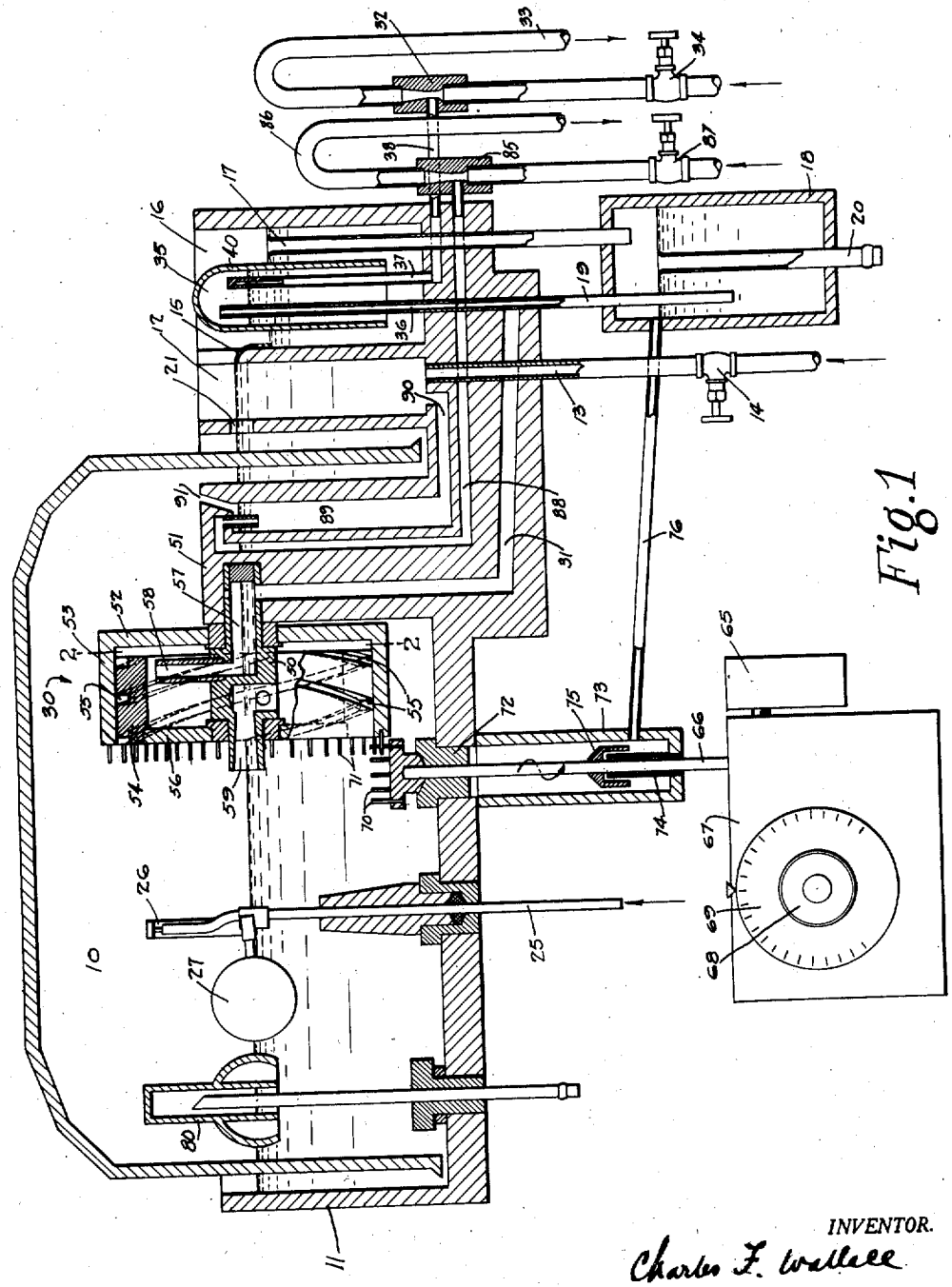

June 8, 1937. C. F. WALLACE 2,083,412
METHOD AND APPARATUS FOR SUPPLYING GAS
Filed Sept. 1, 1934 2 Sheets-Sheet 2

INVENTOR.
Charles F. Wallace
BY
Arthur L. Kent
his ATTORNEY.

Patented June 8, 1937

2,083,412

UNITED STATES PATENT OFFICE 2,083,412

METHOD AND APPARATUS FOR SUPPLYING GAS

Charles F. Wallace, Westfield, N. J., assignor to Wallace & Tiernan Company, Inc., Belleville, N. J., a corporation of New York Application September 1, 1934, Serial No. 742,509

22 Claims. (Cl. 210—28)

This invention relates to a method and apparatus for supplying gas at a controlled rate. The object of the invention is generally to provide an improved method and apparatus whereby the gas may be supplied accurately at very low rates of flow and by an apparatus which will have a comparatively great range of flow.

The invention has been made especially with the idea of providing a method and apparatus for supplying chlorine at accurately controlled low rates for treating very small water supplies. In treating water and watery liquids with chlorine, the chlorine is usually fed into a stream of the water to be treated. The amount of chlorine used is very small compared to the amount of water treated, and it is necessary that the rate of supply of the chlorine be accurately controlled and that it be metered in order that the amount being supplied may be known.

One of the most difficult problems connected with the treatment of water with chlorine gas has been that of properly controlling and applying the exceedingly small amounts of chlorine required for the water supplies for very small towns, camps, hotels, swimming pools, and the like. The amount of chlorine required for treating these small supplies of water may be in the neighborhood of .02 or .03 of a pound of chlorine per day, or even very much less than this.

One type of chlorine control apparatus heretofore made will feed chlorine gas satisfactorily down to about .05 of a pound per day, and due to lack of anything better such apparatus has been used for feeding chlorine down as low as .01 of a pound per day, but the operation of the apparatus at such low capacity has been very erratic and very unsatisfactory. Other types of chlorine control apparatus heretofore known and used have not been suitable for feeding the gas at a rate of much less than 1 pound of chlorine per day. Also, there has been no practical automatic apparatus for feeding chlorine gas at rates varying in proportion to the flow of water to be treated suitable for treating these very small water supplies.

The customary way of supplying chlorine gas is to cause the gas to pass through a flow controlling orifice, and to determine the rate of flow by controlling the drop in pressure across the orifice, the flow being measured either by measuring the drop in pressure across a flow measuring orifice, which is the flow controlling orifice or a separate orifice, or by connecting a hydraulic volumetric meter, either a pulsating meter or a bubble meter, in the flow line beyond the flow controlling orifice.

Most of the difficulty in the use of such apparatus is due to the fact that for supplying the chlorine at a very low rate the orifice or orifices used must be so small that they become clogged by foreign matter carried by the gas so that the flow is substantially retarded or even liable to be entirely stopped. Orifice measuring apparatus has also the characteristic, which is especially disadvantageous in apparatus for treating very small water supplies, that the flow range, that is, the ratio between the minimum and the maximum flow, is comparatively low, the range for any one flow measuring orifice being in practice usually not more than approximately 1 to 5. With chlorinators which have hydraulic volumetric meters with their apparently wide range of flow, there has been, in addition to the difficulty due to clogging of the flow controlling orifice, the disadvantage that in setting the rate of flow it is necessary to count the number of bubbles or pulsations and then to refer to a chart or scale to obtain the rate of flow.

Control apparatus according to the present invention will feed accurately small rates of flow of chlorine gas down to practically zero feed, and has an exceedingly wide range of feed, it being entirely practical to obtain ranges of feed from the maximum of the apparatus down to zero without substitution of any part of the apparatus.

According to the invention, instead of depending on a controlled drop in pressure across an orifice or other pressure difference for determining the rate of feed of the gas, I employ a feeding and metering device whereby separate volumes of gas at a constant pressure are moved successively, at a rate which determines the rate of supply of the gas, from a constant pressure supply and delivered to a chamber or space from which the gas is then withdrawn at a rate controlled by the pressure in such chamber or space to maintain the pressure in said chamber or space substantially constant. The rate at which the gas is so withdrawn will thus be the rate at which the gas is moved by and discharged from the feeding and metering device, and the rate at which the feeding and metering device is operated determines the rate at which the gas is supplied by the apparatus. An extremely accurate control for supplying gas at any rate within the capacity of the apparatus down to practically zero feed is thus obtained without the use of any small orifices liable to become clogged and thereby affect the accuracy of the control.

Most desirably, control apparatus according to the invention is designed to operate with the gas supplied to the feeding and metering device at atmospheric pressure, and is a so-called solution feed apparatus in which the gas delivered by the feeding and metering device is withdrawn by a suction device in the form of a water aspirator operated usually by a minor stream of water into which the gas is drawn to be mixed with the minor stream and discharged therewith into the main stream of water to be treated, or in treating a very small flow of water the entire flow may be passed through the aspirator. The aspirator has a capacity in excess of that required to withdraw the gas as fast as delivered by the feeding and metering device, and this excess capacity is satisfied by water from a column raised by the suction of the aspirator to provide a slight negative head which determines the pressure maintained between the aspirator and the feeding and metering device, this gas pressure in turn controlling the level of the water column and the amount of water, and therefore the amount of gas, sucked into the minor stream by the aspirator.

The invention includes an improved feeding and metering device which is simple in construction and reliable in use, and is without valves or other moving parts which are liable to give difficulty because of the corrosive action of the chlorine in the presence of water.

The use of this improved feeding and metering device, or of other suitable feeding and metering devices, for moving and delivering separate successive volumes of the gas in a control apparatus for chlorine or other treating gas has, in addition to other advantages, the advantage that the rate of feed of the gas may be readily varied by means of a suitable speed control device adjusted manually or automatically, the driving means being any constant speed motor. Automatic control of the speed at which the feeding device is driven to vary the rate of supply of the gas according to the quantity of flowing water which is to be treated may also readily be provided. A dial and pointer show the speed at which the feeding and metering device is driven, and, therefore, the rate at which the gas is being supplied, and this dial may be calibrated to show directly the rate of gas supply in pounds of gas per day or otherwise as desired. If desired, separate metering means may be provided for showing the rate of supply, in which case the feeding and metering device may serve merely as a means for feeding the gas at a controlled rate. Most desirably, however, the device is employed to serve both to positively feed the gas at a desired rate according to its speed and to show the rate at which the gas is being supplied.

Other features of the invention will appear from the following description.

A full understanding of the invention can best be given by a detailed description of an approved form of apparatus for carrying out the process and embodying the various apparatus features of the invention, and such a description will now be given in connection with the accompanying drawings illustrating such an apparatus designed especially for treating flowing water with chlorine.

Figure 2:
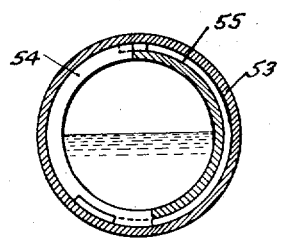
Figure 3:
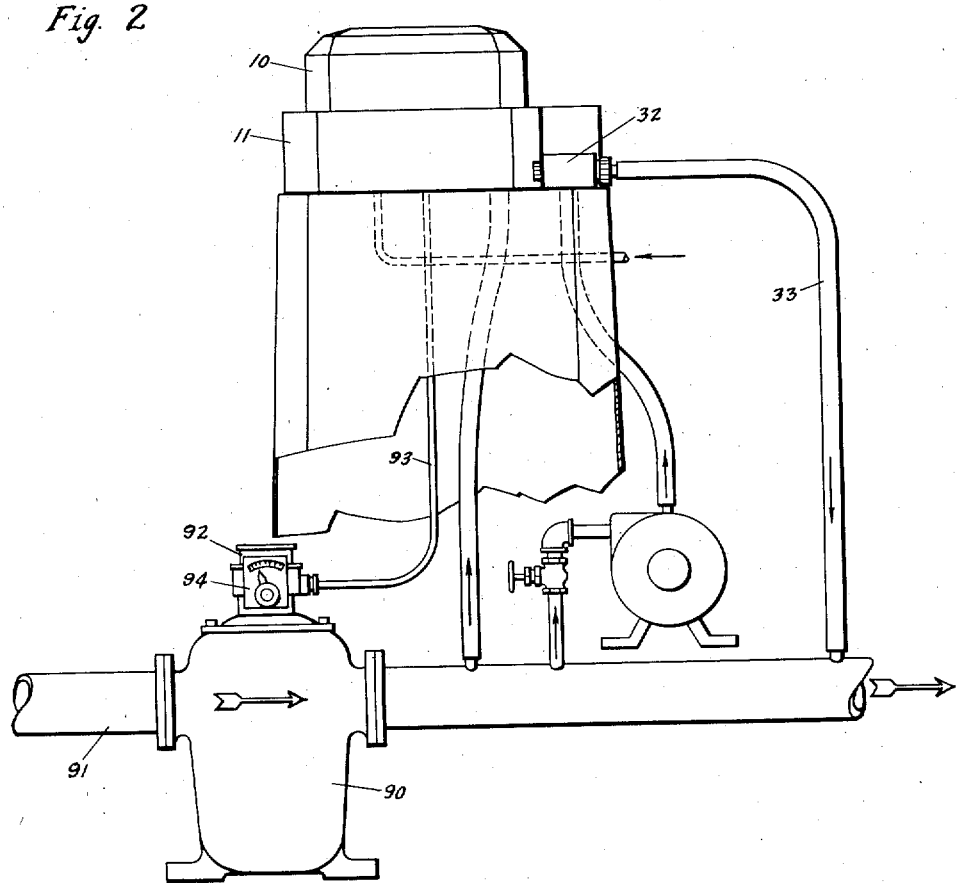

In said drawings:

Fig. 1 is a sectional view, partly diagrammatic, of such an apparatus;

Fig. 2 is a detail sectional view of parts of the gas feeding and metering device taken on line 2—2 of Fig. 1 and partly broken away and sectioned to show one of the gas transfer passages; and Fig. 3 is a view in elevation of the apparatus shown in Fig. 1 illustrating an installation in which the gas feeding and metering device is driven by a water meter in the pipe through which the water to be treated flows.

Referring to the drawings, 10 is a chamber formed by a bell jar which stands open end down in a tray 11, in which chamber, when the apparatus is in operation, a supply of chlorine gas is maintained under a constant substantially atmospheric pressure. Water is supplied to and maintained at a constant level in the tray 11, and the bell jar is supported in the tray so as to provide for the passage of water into the jar beneath its lower edge. Any suitable means may be provided for maintaining a constant water level in the tray. As shown, water is supplied to the tray from a supply compartment 12 which is fed from any suitable source of supply through a pipe 13 at a rate controlled by a valve 14. The chamber 12 is open to atmosphere, and water from the chamber overflows over a weir 15 into a compartment or chamber 16 from which an overflow pipe 17 discharges into a tank 18 which provides a water seal for a drip pipe 19 leading from the gas supply line and from which the overflow escapes through pipe 20 to waste. With water constantly flowing into the compartment 12 and overflowing over the weir 15, a constant level will be maintained in the compartment. The tray 11 is open to atmosphere and is connected with the compartment 12 by a supply opening 21 so that water is maintained at a constant level in the tray. The water level within the jar will depend on the gas pressure within the jar, and when the gas pressure is equal to atmospheric pressure the water within the jar will stand at the same level as in the tray outside the jar.

Chlorine gas is supplied to the chamber 10 from a suitable source of supply under pressure, such as a tank of compressed liquefied chlorine. The gas flows into the chamber through a tube 25 which extends upward through a stuffing box to a point above the maximum water level in the chamber, and the supply of chlorine to the chamber is controlled by means of a valve 26 which seats in a valve seat at the upper end of the tube 25 and is operated by a ball float 27, which are or may be as more fully described in my Patents Nos. 1,514,939 and 1,777,986. When in the operation of the apparatus, gas is fed from the chamber and the pressure within the chamber is reduced below the desired pressure, the water will rise within the chamber and the float will be raised to open the valve 26, thus permitting chlorine gas to enter the chamber. If the gas enters the chamber faster than it is fed from the chamber, the water level within the chamber is depressed, permitting the float to fall and close the valve. Equilibrium is thus established and chlorine gas is supplied to the chamber at the rate at which it is fed from the chamber, and a supply of gas will thus be maintained within the chamber at the desired pressure and the water will be maintained at the desired level. The gas pressure and water level maintained within the chamber will be determined by the elevation of the float and valve operating mechanism, which are most desirably set so as to maintain, as stated, substantially atmospheric pressure within the chamber, in which case, the water level will be substantially the same as in the tray outside the chamber.

Gas is fed from the chamber by a motor driven feeding and metering device 30 by which a succession of separate measured volumes of gas are moved from the gas space within the chamber 10 and delivered to flow through a passage 31 to means for withdrawing the gas as fast as it is delivered by the feeding and metering device. In the construction shown, and most desirably, the gas is thus withdrawn by means of a water aspirator 32 connected in a pipe 33 supplied with water from any suitable source of supply and which discharges into the water to be treated. The flow of water through the aspirator and its consequent capacity may be controlled by a valve 34.

In order that the aspirator shall withdraw the gas at the rate at which it is delivered into the passage 31 by the feeding and metering device, the aspirator should operate with a capacity slightly greater than required for withdrawing the gas delivered by the feeding and metering device, and means is provided for supplying water to satisfy the excess capacity of the aspirator and to limit the amount of gas withdrawn by the aspirator to the amount delivered by the feeding and metering device, so that the gas pressure between the feeding and metering device and the aspirator will be maintained substantially constant and substantially equal to the pressure within the gas supply chamber 10. For this purpose, a suction chamber 35 is provided into which the gas from the delivery passage 31 is discharged through a tube 36 and from which the gas is withdrawn by the aspirator through a passage provided by tubes 37 and 38. The suction chamber is formed by a casing 40 set in the compartment 16 closed at the top and extending down into the water in the compartment and open to permit entrance of water at its lower end so that water will rise within the casing to a level determined by the gas pressure within the chamber 35.

The delivery tube 36 opens to the chamber above the maximum water level within the chamber. The elevation within the suction chamber of the inlet opening of the tube 37 through which the gas is withdrawn by the aspirator will determine the gas pressure which is maintained within the suction chamber. If the inlet opening is at the level of the water within the compartment 16, the pressure will be that of atmosphere. If it is above the water level of the compartment, a sub-atmospheric, or negative, pressure will be maintained, and if it is below the water level of the compartment, a super-atmospheric pressure will be maintained. Most desirably when, as is preferable, the gas is maintained at atmospheric pressure within the supply chamber 10, the inlet opening of the tube 37 is slightly above the water level in the compartment 16 so that a slightly negative pressure is maintained within the suction chamber. With the inlet to the tube 37 so located, the suction of the aspirator reduces the pressure within the suction chamber 35 until the water rises within the chamber to the tube inlet. Thereupon, water enters through the tube inlet to satisfy the excess capacity of the aspirator.

The water level within the suction chamber is thus controlled according to the pressure within the chamber, and more or less water passes through the tube 37 to the aspirator as the gas pressure in the chamber is slightly less or more, more water and less gas being withdrawn by the aspirator if the pressure in the chamber drops slightly, and less water and more gas being withdrawn if the pressure in the chamber rises slightly. The rate at which the gas is withdrawn by the aspirator is thus controlled by the pressure in the suction chamber, and is so controlled as to maintain the pressure in the suction chamber substantially constant. The aspirator thus withdraws the gas at the rate at which it is delivered by the feeding and metering device, mixes it with a minor flow of water flowing through the pipe 33, and continuously discharges the solution thus formed into the water to be treated.

I have shown in the drawings a feeding and metering device which is particularly adapted for use in a chlorine control apparatus according to the invention and which in itself forms a feature of the invention. The device as shown comprises a hollow cylindrical rotor which is mounted to rotate on a horizontal axis partly submerged within the chamber 10. The rotor is mounted on a fixed axle 50 extending from a post 51 which extends upward from the bottom of the tray 11. The rotor casing comprises a back plate 52 from which extends a peripheral flange 53. Fitted within the flange 53 is a hollow cylindrical piece 54 which is exteriorly helically grooved to provide a plurality of passages 55 extending circumferentially and helically in the peripheral wall of the rotor casing, each passage extending from an inlet opening in the front face of the rotor to an outlet opening to a space within the rotor casing, and the inlet and outlet of each passage being spaced circumferentially of the rotor sufficiently so that both cannot be above the water level in the chamber 10 at the same time. When the rotor is submerged half way, as shown, that is, with its axis of rotation at the water level, each passage should extend from its outwardly opening inlet to its inwardly opening outlet slightly over 180° circumferentially of the rotor. The several passages have their inlet openings equally spaced circumferentially of the rotor. The piece 54 ends short of the rear wall 52 so as to provide communication from the outlet ends of the passages when formed as shown by external grooves in the piece 54 to the chamber or space within the rotor casing. The rotor may be provided with any suitable or desired number of the passages 55. I have found it convenient to provide from two to eight such passages in rotors of the sizes which have been made. A plate 56 forms the front wall of the rotor casing.

The rotor is mounted on the axle 50 by means of bearing collars set in central openings of the back and front plates 52 and 56 as shown. The axle 50 has an axial gas outlet or discharge port 57 in its end which extends into the post 51, and a short tube 58 extends upward within the space within the rotor casing from the inner end of the port. The gas delivery passage 31 leads from the port 57. The outer end of the axle 50 is formed with an axial water outlet 59 from the inner end of which there is an opening through the under side of the shaft.

The rotor is rotated in the direction in which the inlets of the passages 55 are at the front ends of the passages in the direction of rotation. The portion of each passage which is below the water level will then be filled with water, and the portion above the water level will be filled with gas; and as water enters each passage during the rotation of the rotor, it will move the gas which is in the passage through the passage and cause it to be discharged from the inner end of the passage into the interior of the rotor casing. Then as the rotation continues after all of the gas has been discharged from the passage, the water will flow from the inner end of the passage and fall into the lower part of the space within the rotor while gas enters the passage through its inlet end which is then moving through the gas space of the chamber 10. In each revolution of each passage, therefore, it will take in a measured volume of gas from the chamber 10 and will discharge it into the interior of the rotor casing, the rotor thus acting to move and deliver from the gas chamber 10 separate measured volumes of gas successively to the interior of the rotor casing from where gas then flows out through the tube 58 and axial passage 57 and then through passage 31 to the suction chamber 35. The water moved by the rotation of the rotor from the chamber 10 to the interior of the rotor flows out through the axial water outlet 59.

The rotor, as well as other parts of the apparatus with which wet chlorine comes into contact, must of course be made of chlorine resistant material. The various parts of the rotor may be made of any suitable chlorine resistant material, such as hard rubber and lava.

The rotor may be driven by any suitable means which will provide a constant speed of rotation with the necessary speed adjustment. Very little power is required to drive the rotor. As shown, a small motor indicated at 65, which may be a constant speed electric motor or other suitable constant speed motor, drives a shaft 66 through a variable speed device indicated at 67 having a control knob 68 with which is associated a dial 69 which may be calibrated in pounds of chlorine per 24 hours or otherwise as desired. The shaft 66 extends through the bottom of the tray 11 and carries at its upper end a crown pinion formed by a ring of equally spaced pins 70 which mesh with similarly spaced pins 71 of chlorine resistant material forming a crown gear on the face of the rotor. To avoid friction, the bearing 72 for the pinion shaft 66 in the bottom of the tray 11 has no stuffing box, and to take care of the slight leakage through this bearing the shaft for a short distance below the tray is enclosed in a tubular casing 73 from the bottom of which a tube 74 extends upward about the shaft, a cylindrical shield 75 on the shaft extending down about the upper end of the tube 74. The water trapped in the lower part of the casing 73 escapes through a tube 76 to the tank 18.

If at any time there should be a decrease in gas pressure in the chamber 10 due to failure of chlorine supply to the chamber, the water level would rise within the chamber. To prevent under any such circumstances the water rising to the top of the chlorine supply tube 25, a vacuum relief device 80 is provided, as in the apparatus shown in my Patents Nos. 1,514,939 and 1,777,986, which operates to admit air to the chamber 10 whenever the water rises to a level above the normal level but below the danger level. This device, as explained in my said patents, will also operate as a relief device for excess pressure of gas in the chamber 10 in the event that there should be a leak in the chlorine valve 26 permitting the chlorine to flow into the chamber 10 faster than it is fed out by the rotor 30. But it is usually not desirable to rely on the vacuum relief device for discharging excess chlorine from the chamber, and I have therefore provided in this apparatus means whereby if an excess of chlorine should be supplied to the chamber 10 increasing the pressure and forcing down the water level within the chamber, gas will be withdrawn from the chamber so long as the pressure therein is greater by a slight degree than the desired pressure, and which also serves as a means for quickly evacuating the chamber of the chlorine gas if it is desired to remove the bell jar to obtain access to the parts thereunder when the apparatus is shut down.

For this purpose, there is provided, as shown in the drawings, an auxiliary aspirator 85 connected in a pipe 86 through which water from any suitable source flows through the pipe and aspirator at a rate which may be controlled by valve 87. This aspirator connects by a passage 88 to a compartment 89 formed, as shown, in the post 51 and connected by passage 90 to the water supply compartment 12, and also connected at the top through a port 91 to the gas space of the chamber 10. The water level within the compartment 89 will thus be always the same as the water level in the chamber 10. The suction passage 88 has its inlet end open to the compartment 89 at a distance just slightly below the normal water level.

In normal operation of the apparatus, therefore, the auxiliary aspirator 85 will be drawing water from the compartment 89, but if at any time there should be an increase in the gas pressure in the chamber 10 sufficient to force the water level down so that the water level in the compartment 89 is below the inlet to the suction passage 88, then the auxiliary aspirator will immediately draw gas instead of water until the pressure in the chamber 10 is reduced to substantially the normal working pressure. The auxiliary aspirator will thus take care of any excessive supply of gas to the chamber 10 which is within its capacity. If it is desired at any time to withdraw the gas remaining in the chamber 10 after the rotor has been stopped and the supply of gas shut off and the water valve 14 closed, the auxiliary aspirator will first reduce slightly the water level within the chamber 10 and then withdraw the chlorine gas from the chamber, the gas being replaced by air entering through the vacuum relief 80.

In the construction shown, all the water required for maintaining the water within the tray 11 and for make-up water for the two aspirators is taken from the supply compartment 12 to which water is supplied through the supply pipe 13. The rate of supply to the compartment 12 should be adjusted, as by means of the valve 14, so that there will always be a slight excess of water going to waste through the overflow pipe 17 to the water seal tank 18 and thence through overflow pipe 20. It will be noted, also, that because of the separation of the compartment 12 from the main compartment of the tray 11, and especially with the slight leakage through the bearing of the driving shaft 66, there is not liable to be any movement of water from the main compartment of the tray into the water supply compartment 12, and that there will, therefore, be no chlorine in the make-up water going to either aspirator, and that the water in the main portion of the tray and in the chamber 10 will be practically stagnant so that there will be little likelihood of formation of chlorine hydrate.

As stated, the new control apparatus lends itself readily to combination with automatic control features to produce automatic chlorinators whereby the rate of supply of chlorine is automatically varied according to the rate of flow of water being treated. As the rate of supply of the chlorine or other gas is varied merely by suitably varying the rate at which the chlorine feeding rotor is driven, all that is necessary in order to provide for such automatic variation of the rate of supply is to provide means for driving the rotor at a rate which varies directly in proportion to variations in the quantity of water flowing. This may, of course, be accomplished in various ways.

In Fig. 3 I have illustrated a simple and convenient way in which to obtain automatic variation of the rate of supply of the chlorine to a small flow of water. As shown in this figure, a water meter 90 in the pipe 91 through which the water to be treated flows, serves as a motor for driving the gas feeding rotor of the chlorinator. A changeable gear within a casing 92 is mounted on the water meter, and from this gear the chlorinator rotor within the chamber 10 is driven by means of a flexible shaft 93. As the quantity of water flowing through the pipe 91 varies, the speed of the meter 90 will vary correspondingly, and this will cause corresponding variation in the rate of rotation of the chlorinator rotor and, therefore, of the rate at which gas is fed by the aspirator 32 into the minor stream of water which flows from the aspirator through the pipe 33 into the main stream of water to be treated flowing in the pipe 91. The dosage, or ratio between the amount of chlorin supplied and the quantity of water treated, may be varied for any given gas feeding rotor by suitably changing the gears in the gear casing 92. For convenience, however, a variable speed device 94 may be provided, and this device may have, as indicated, a dial and pointer associated with its control knob.

What is claimed is:

1. The method of supplying gas at a controlled rate, which comprises reducing the pressure of gas from a source of supply under pressure to a substantially constant pressure, moving and delivering separate successive measured volumes of the gas at a controlled rate to a receiving space, withdrawing the gas so delivered at a rate controlled by the pressure of the delivered gas to maintain such pressure substantially constant, and varying the rate at which the gas is supplied by varying the rate at which the successive measured volumes of the gas are moved and delivered.

2. The method of supplying gas at a controlled rate, which comprises maintaining a supply of the gas at a constant substantially atmospheric pressure, moving and delivering separate successive measured volumes of the gas at a controlled rate to a receiving space, withdrawing the gas so delivered at a rate controlled by the pressure of the delivered gas to maintain such pressure slightly below atmospheric pressure, and varying the rate at which the gas is supplied by varying the rate at which the successive measured volumes of the gas are moved and delivered.

3. The method of supplying gas at a controlled rate, which comprises maintaining a supply of the gas at constant pressure and sealing liquid at a constant level in a gas supply chamber, moving separate successive measured volumes of the gas from the gas space in said chamber and through the liquid in said chamber and delivering them from the chamber at a controlled rate to a receiving chamber, withdrawing the gas so delivered by suction, and controlling the rate at which the gas is withdrawn by controlling the suction to maintain a substantially constant pressure in the receiving chamber.

4. The method of supplying treating gas to flowing water, which comprises reducing the pressure of gas from a source of supply under pressure to a substantially constant pressure, moving and delivering separate successive measured volumes of the gas at a controlled rate to a receiving space, withdrawing the gas as it is so delivered and discharging it into the flowing water, controlling the rate at which the delivered gas is withdrawn to maintain the pressure against which the gas is delivered substantially constant, and varying the rate at which the gas is discharged into the water by varying the rate at which the successive measured volumes are moved and delivered.

5. The method of supplying gas at a controlled rate, which comprises drawing from a supply of gas at a constant pressure successive separate measured volumes of the gas at a controlled rate, discharging such measured volumes to a receiving space, withdrawing the gas from said space, controlling automatically the rate at which the gas is withdrawn from said space to maintain the pressure in said space substantially constant, and varying the rate at which the gas is supplied by varying the rate at which the successive measured volumes of the gas are drawn from the constant pressure supply.

6. Apparatus for supplying gas at a controlled rate, comprising pressure reducing means for supplying the gas at a substantially constant pressure, a driven feeding device for moving and delivering measured volumes of the gas so supplied successively at a rate dependent on the speed of the feeding device, means for withdrawing the delivered gas at a rate to maintain the pressure against which the gas is delivered by the feeding device substantially constant, and means for varying the speed at which the feeding device is driven to vary the rate at which the gas is supplied by the apparatus.

7. Apparatus for supplying gas at a controlled rate, comprising pressure reducing means for supplying the gas at a substantially constant pressure, a driven feeding device for moving measured volumes of the gas so supplied successively at a rate dependent on the speed of the feeding device, a suction device, a passage leading from the feeding device to the suction device, means for controlling automatically the rate at which the suction device withdraws the gas to maintain a substantially constant pressure between the feeding device and the suction device, and means for varying the speed of the feeding device to vary the rate at which the gas is supplied by the apparatus.

8. Apparatus for supplying gas at a controlled rate, comprising a supply chamber, means for maintaining a supply of the gas at a constant pressure in said chamber, a driven feeding and metering device for moving and delivering measured volumes of gas from said chamber successively at a rate dependent on the speed of the feeding and metering device, and means for withdrawing the gas so delivered at a rate controlled by the pressure of the delivered gas to maintain the pressure against which the gas is delivered by the feeding and metering device substantially constant.

9. Apparatus for supplying gas at a controlled rate, comprising a supply chamber, means for maintaining a supply of the gas at a constant pressure in said chamber, a driven feeding and metering device for moving and delivering measured volumes of gas from said chamber successively at a rate dependent on the speed of the feeding and metering device, means for withdrawing the gas so delivered at a rate controlled by the pressure of the delivered gas to maintain the pressure against which the gas is delivered by the feeding and metering device substantially constant, and means for varying the speed at which the feeding and metering device is driven for varying the rate at which the gas is supplied by the apparatus.

10. Apparatus for supplying gas at a controlled rate, comprising a supply chamber, means for maintaining a supply of the gas at a constant pressure in said chamber, a receiving chamber, motor driven means for moving measured volumes of gas successively from the supply chamber to the receiving chamber, and gas feeding means for withdrawing gas from the receiving chamber at a rate controlled by the pressure in the receiving chamber to maintain a constant pressure therein.

11. Apparatus for supplying gas at a controlled rate, comprising a gas supply chamber, means for maintaining liquid at a constant level and gas at a constant pressure in said chamber, a hollow cylindrical rotor mounted within the chamber on a horizontal axis and partly submerged in the liquid in the chamber, said rotor having an axial water outlet to the chamber and an axial gas outlet and having a plurality of passages each having an outwardly opening inlet and an inwardly opening outlet spaced circumferentially of the rotor sufficiently so that both shall not be above the water level at the same time, and gas feeding means for withdrawing gas from the axial gas outlet of the rotor adapted to maintain a constant pressure at said outlet.

12. Apparatus for supplying gas at a controlled rate, comprising a gas supply chamber, means for maintaining water at a constant level and gas at a constant pressure in said chamber, a hollow cylindrical rotor mounted within the chamber on a horizontal axis and substantially one-half submerged in the water in the chamber, said rotor having an axial water outlet to the chamber and an axial gas outlet and having a plurality of passages each having an outwardly opening inlet and an inwardly opening outlet spaced more than 180° circumferentially of the rotor, gas feeding means for withdrawing gas from the axial gas outlet of the rotor adapted to maintain the pressure at said outlet substantially equal to the gas pressure within said chamber, and means for varying the speed of rotation of the rotor to vary the rate at which gas is fed by the gas feeding means.

13. Apparatus for supplying gas at a controlled rate, comprising a gas supply chamber, means for maintaining water at a constant level and gas at a constant substantially atmospheric pressure in said chamber, a motor driven hollow cylindrical rotor mounted within the chamber on a horizontal axis and partly submerged in the water in the chamber, said rotor having an axial water outlet to the chamber and an axial gas outlet and having a plurality of passages each having an outwardly opening inlet and an inwardly opening outlet spaced circumferentially of the rotor sufficiently so that both shall not be above the water level at the same time, a suction device connected to a passage leading from the gas outlet of the rotor, means controlled by the gas pressure in said passage for maintaining the pressure on the suction side of the suction device substantially constant, and means for varying the speed of rotation of the rotor to vary the rate at which gas is withdrawn by the suction device.

14. Apparatus for supplying gas at a controlled rate, comprising a supply chamber, means for maintaining a supply of the gas at substantially atmospheric pressure in said chamber, a gas feeding and metering device for moving and delivering measured volumes of gas from said chamber successively at a rate dependent on the speed at which the feeding and metering device is driven, a water aspirator, a passage leading to the aspirator from the gas outlet of the feeding and metering device, means for maintaining a substantially atmospheric pressure on the suction side of the aspirator determined by the head of a column of water which supplies the excess capacity of the aspirator, and means for varying the speed at which the feeding and metering device is driven for varying the rate at which the gas is withdrawn by the aspirator.

15. Apparatus for supplying treating gas to flowing water, comprising pressure reducing means for supplying the gas at a substantially constant pressure, a gas feeding device for moving and delivering measured volumes of the gas so supplied successively at a rate dependent on the speed at which the feeding device is driven, means for withdrawing the delivered gas at a rate to maintain the pressure against which the gas is delivered by the feeding device substantially constant and for discharging it into the flowing water, and means for varying the speed at which the feeding device is driven proportionately to variations in the quantity of water flowing to maintain for varying rates of flow of the water a fixed ratio between the rate of supply of the gas thereto and the rate of flow of the water.

16. Apparatus for supplying a treating gas to flowing water, comprising a supply chamber, means for maintaining a supply of the gas at a constant pressure in said chamber, a receiving chamber, a gas feeding device for moving measured volumes of gas successively from the supply chamber to the receiving chamber at a rate dependent on the speed at which the feeding and metering device is driven, a suction device for drawing gas from said receiving chamber and discharging it into the flowing water, means for controlling automatically the rate at which the suction device draws the gas from the feeding device to maintain a substantially constant pressure between the feeding device and the suction device, and means controlled by the flowing water for varying the speed at which the feeding device is driven for varying the rate at which the gas is supplied to the flowing water by the suction device to maintain for varying rates of flow of the water a fixed ratio between the rate of supply of gas thereto and the rate of flow of the water.

17. Apparatus for supplying treating gas to flowing water, comprising a gas supply chamber, means for maintaining water at a constant level and gas at a constant pressure in said chamber, a hollow cylindrical rotor mounted within the chamber on a horizontal axis and partly submerged in the water in the chamber, said rotor having a plurality of passages each having an outwardly opening inlet and an inwardly opening outlet spaced circumferentially of the rotor sufficiently so that both shall not be above the water level at the same time and having a gas outlet for gas discharged from the inwardly opening outlets of said passages, a suction chamber connected to said gas outlet, a water aspirator for drawing gas from the suction chamber and mixing it with water and discharging the solution into the water to be treated, means for controlling automatically the rate at which the aspirator draws gas from the suction chamber to maintain a constant pressure in the suction chamber, and means for varying the speed of rotation of the rotor to vary the rate of supply of gas to the suction chamber according to variations in the quantity of water flowing.

18. Apparatus for supplying gas, comprising a gas chamber extending upward from a constant level water holding tray from which water has access to the interior of the chamber, means for supplying gas to said chamber, means responsive to variations in the level of water within the chamber for controlling the supply of gas to the chamber to maintain a constant substantially atmospheric pressure therein, a motor driven gas feeding device for moving and delivering measured volumes of gas from said chamber successively, a suction chamber to which the gas is delivered by said device, a water aspirator for withdrawing gas from the suction chamber, means for controlling automatically the rate at which the aspirator withdraws gas from the suction chamber to maintain a constant slightly negative pressure in the suction chamber, means for varying the rate at which the feeding device is driven to vary the rate at which the gas enters the aspirator, an auxiliary aspirator connected to draw water from a separate chamber having an opening to the gas space within the gas chamber and to which water is supplied to maintain the level therein the same as the water level within the gas chamber, the inlet opening from said separate chamber to the passage leading to the auxiliary aspirator being slightly below the normal water level in said separate chamber.

19. A gas feeding and metering device, comprising a hollow cylindrical rotor, and a fixed horizontal axle on which the rotor is mounted, the rotor having a passage having an outwardly opening inlet and an inwardly opening outlet spaced circumferentially of the rotor, and the fixed axle having a gas outlet port communicating with the upper part of the space within the rotor and a liquid outlet port communicating with a lower part of the space within the rotor.

20. A gas feeding and metering device, comprising a hollow cylindrical rotor, and a fixed horizontal axle on which the rotor is mounted, the rotor having a plurality of helical passages in overlapping relation and each having an outwardly opening inlet and an inwardly opening outlet spaced circumferentially of the rotor, and the fixed axle having a gas outlet port communicating with the upper part of the space within the rotor and a liquid outlet port communicating with a lower part of the space within the rotor.

21. Apparatus for supplying gas at a controlled rate, comprising a supply chamber, means for maintaining a supply of the gas at a constant pressure in said chamber, mechanically operated means for drawing from the supply chamber and delivering successive separate measured volumes of the gas at a controlled rate to a receiving space, and gas feeding means for withdrawing the gas from said space, and means for automatically controlling said feeding means to maintain the pressure in said space substantially constant.

22. Apparatus for supplying gas at a controlled rate, comprising a gas supply chamber, means for maintaining liquid at a constant level and gas at a constant pressure in said chamber, a gas feeding device in said chamber partly submerged in the liquid and having a gas passage therein, and means for moving said device to cause successive volumes of gas to pass through said passage between successive slugs of liquid, said device having a gas outlet for discharging the gas delivered from said passage and a water outlet for returning to the chamber the water which has passed through said passage, and gas feeding means for withdrawing the gas from said gas outlet adapted to maintain a constant pressure at said outlet.

CHARLES F. WALLACE.

---

CERTIFICATE OF CORRECTION.

Patent No. 2,083,412.     June 8, 1937.

CHARLES F. WALLACE.

It is hereby certified that error appears in the printed specification of the above numbered patent requiring correction as follows: Page 6, second column, lines 48 and 49, claim 16, strike out the words "and metering; and that the said Letters Patent should be read with this correction therein that the same may conform to the record of the case in the Patent Office.

Signed and sealed this 31st day of August, A. D. 1937.

(Seal)

Leslie Frazer
Acting Commissioner of Patents.

ing outlets of said passages, a suction chamber connected to said gas outlet, a water aspirator for drawing gas from the suction chamber and mixing it with water and discharging the solution into the water to be treated, means for controlling automatically the rate at which the aspirator draws gas from the suction chamber to maintain a constant pressure in the suction chamber, and means for varying the speed of rotation of the rotor to vary the rate of supply of gas to the suction chamber according to variations in the quantity of water flowing.

18. Apparatus for supplying gas, comprising a gas chamber extending upward from a constant level water holding tray from which water has access to the interior of the chamber, means for supplying gas to said chamber, means responsive to variations in the level of water within the chamber for controlling the supply of gas to the chamber to maintain a constant substantially atmospheric pressure therein, a motor driven gas feeding device for moving and delivering measured volumes of gas from said chamber successively, a suction chamber to which the gas is delivered by said device, a water aspirator for withdrawing gas from the suction chamber, means for controlling automatically the rate at which the aspirator withdraws gas from the suction chamber to maintain a constant slightly negative pressure in the suction chamber, means for varying the rate at which the feeding device is driven to vary the rate at which the gas enters the aspirator, an auxiliary aspirator connected to draw water from a separate chamber having an opening to the gas space within the gas chamber and to which water is supplied to maintain the level therein the same as the water level within the gas chamber, the inlet opening from said separate chamber to the passage leading to the auxiliary aspirator being slightly below the normal water level in said separate chamber.

19. A gas feeding and metering device, comprising a hollow cylindrical rotor, and a fixed horizontal axle on which the rotor is mounted, the rotor having a passage having an outwardly opening inlet and an inwardly opening outlet spaced circumferentially of the rotor, and the fixed axle having a gas outlet port communicating with the upper part of the space within the rotor and a liquid outlet port communicating with a lower part of the space within the rotor.

20. A gas feeding and metering device, comprising a hollow cylindrical rotor, and a fixed horizontal axle on which the rotor is mounted, the rotor having a plurality of helical passages in overlapping relation and each having an outwardly opening inlet and an inwardly opening outlet spaced circumferentially of the rotor, and the fixed axle having a gas outlet port communicating with the upper part of the space within the rotor and a liquid outlet port communicating with a lower part of the space within the rotor.

21. Apparatus for supplying gas at a controlled rate, comprising a supply chamber, means for maintaining a supply of the gas at a constant pressure in said chamber, mechanically operated means for drawing from the supply chamber and delivering successive separate measured volumes of the gas at a controlled rate to a receiving space, and gas feeding means for withdrawing the gas from said space, and means for automatically controlling said feeding means to maintain the pressure in said space substantially constant.

22. Apparatus for supplying gas at a controlled rate, comprising a gas supply chamber, means for maintaining liquid at a constant level and gas at a constant pressure in said chamber, a gas feeding device in said chamber partly submerged in the liquid and having a gas passage therein, and means for moving said device to cause successive volumes of gas to pass through said passage between successive slugs of liquid, said device having a gas outlet for discharging the gas delivered from said passage and a water outlet for returning to the chamber the water which has passed through said passage, and gas feeding means for withdrawing the gas from said gas outlet adapted to maintain a constant pressure at said outlet.

CHARLES F. WALLACE.

CERTIFICATE OF CORRECTION.

Patent No. 2,083,412.                      June 8, 1937.

CHARLES F. WALLACE.

It is hereby certified that error appears in the printed specification of the above numbered patent requiring correction as follows: Page 6, second column, lines 48 and 49, claim 16, strike out the words "and metering; and that the said Letters Patent should be read with this correction therein that the same may conform to the record of the case in the Patent Office.

Signed and sealed this 31st day of August, A. D. 1937.

(Seal)                                                Leslie Frazer
                                                 Acting Commissioner of Patents.

CERTIFICATE OF CORRECTION.

Patent No. 2,083,412.  June 8, 1937.

CHARLES F. WALLACE.

It is hereby certified that error appears in the printed specification of the above numbered patent requiring correction as follows: Page 6, second column, lines 48 and 49, claim 16, strike out the words "and metering; and that the said Letters Patent should be read with this correction therein that the same may conform to the record of the case in the Patent Office.

Signed and sealed this 31st day of August, A. D. 1937.

(Seal)

Leslie Frazer
Acting Commissioner of Patents.